(12) United States Patent
Mora

(10) Patent No.: US 8,596,260 B2
(45) Date of Patent: Dec. 3, 2013

(54) SOLAR WATER HEATER

(75) Inventor: Elias Mora, Chula Vista, CA (US)

(73) Assignee: Formula Plastics, Inc., Tecate, CA (US)

( * ) Notice: Subject to any disclaimer, the term of this patent is extended or adjusted under 35 U.S.C. 154(b) by 632 days.

(21) Appl. No.: 12/793,562

(22) Filed: Jun. 3, 2010

(65) Prior Publication Data

US 2010/0307481 A1 Dec. 9, 2010

Related U.S. Application Data

(60) Provisional application No. 61/184,646, filed on Jun. 5, 2009.

(51) Int. Cl.
*F24J 2/24* (2006.01)

(52) U.S. Cl.
USPC ........... 126/640; 126/663; 126/655; 165/171; 165/144; 165/173

(58) Field of Classification Search
USPC .......... 165/171, 144, 173, 175; 126/640, 663, 126/655, 904, 906; 285/122.1, 124.1, 285/124.3, 124.4; 29/890.033
See application file for complete search history.

(56) References Cited

U.S. PATENT DOCUMENTS 4,321,911 A * 3/1982 Offutt ........................... 126/663

* cited by examiner

*Primary Examiner* — Alfred Basichas
(74) *Attorney, Agent, or Firm* — Knobbe Martens Olson & Bear LLP

(57) ABSTRACT

Methods and systems for solar water heating are provided herein. A modular pipe system for a solar water heater is provided in one embodiment. The system includes a plurality of first manifolds which are interchangeably connectable to any other first manifold. The system also includes a plurality of second manifolds which are interchangeably connectable to any other second manifold. The system further includes a plurality of pipe panels which are interchangeably connectable to any other panel, any first manifold, and any second manifold. Connecting the first manifolds and the second manifolds end to end expands the system along a first axis, and connecting a plurality of panels expands the system along a second axis perpendicular to the first axis.

13 Claims, 7 Drawing Sheets

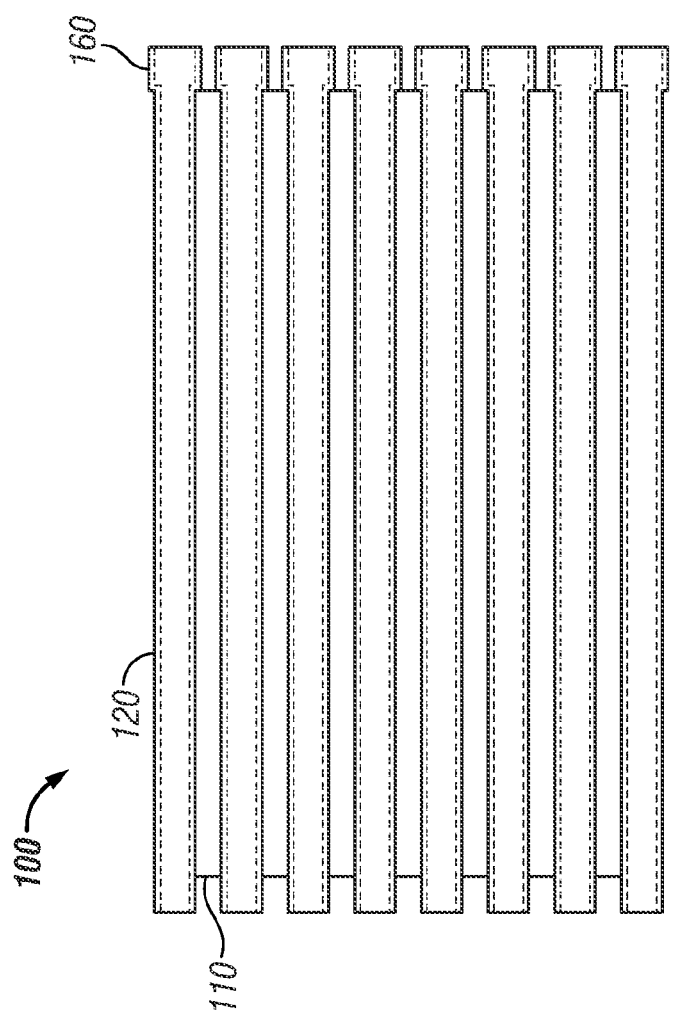
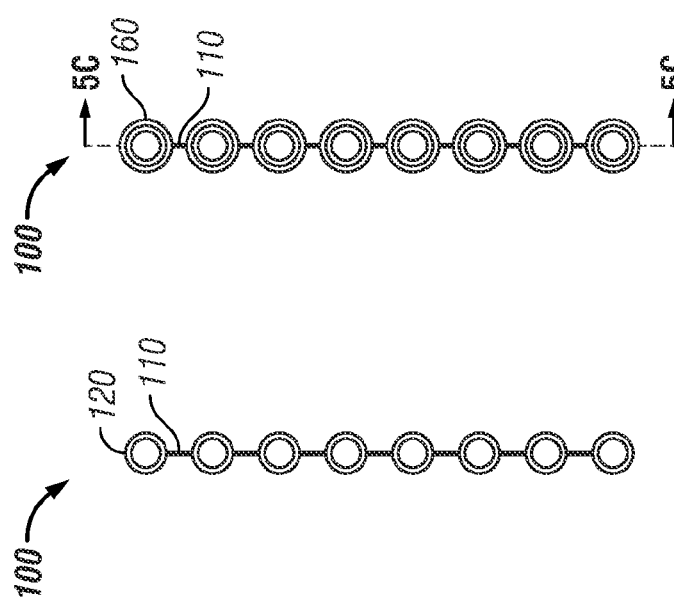

SOLAR WATER HEATER

CROSS-REFERENCE TO RELATED APPLICATIONS

The present application claims the benefit of U.S. Provisional Patent Application Ser. No. 61/184,646, filed on Jun. 5, 2009, which is hereby incorporated by reference in its entirety.

BACKGROUND

1. Field of the Invention

The field of the invention relates to heating devices, and more particularly, to methods and systems for solar water heating.

2. Description of the Related Art

Solar heating systems use solar energy to heat water for a wide variety of uses, including home, business, and industrial uses. For example, individual households equipped with solar water heaters can use heated water for showering, cooking, and washing. Heated water can also be used to heat swimming pools, floors, and household spaces.

Solar heaters generally include a solar thermal collector and a fluid system to move a working fluid, such as water, from the collector to a location where the heated fluid is used. In a simple water heating system, for instance, cold water is pumped to a collector to be heated and the heated water flows back to a collection or reservoir tank for storage and later use. Collectors can consist of formed tubes or panels through which water is circulated and heated by the sun's radiation.

Government-sponsored incentives have increased the appeal of solar hot water systems, but the cost of solar water heaters remains prohibitively high for some due to manufacturing and installation costs associated with the systems. Thus, the development of simple, energy-efficient collection devices remains a significant challenge in the design of solar water heating systems.

SUMMARY OF THE INVENTION

The system, methods, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description" one will understand how the features of this invention provide advantages over other heaters.

A modular pipe system for a solar water heater is provided in one embodiment. The system includes a plurality of first manifolds, each first manifold having a first end fitting and a second end fitting. The first end fitting of any first manifold is interchangeably connectable to the second end fitting of any other first manifold. The system also includes a plurality of second manifolds, each second manifold having a first end fitting and a second end fitting. The first end fitting of any second manifold is interchangeably connectable to the second end fitting of any other second manifold. The system further includes a plurality of panels, each panel comprising a plurality of pipes. Each panel is interchangeably connectable to any other panel, any of the plurality of first manifolds, and any of the plurality of second manifolds. Connecting the first end fitting of any first manifold to the second end fitting of any other first manifold and connecting the first end fitting of any second manifold to the second end fitting of any other second manifold expands the system along a first axis. Connecting a plurality of panels expands the system along a second axis perpendicular to the first axis.

A method of making a modular pipe system for a solar water heater is provided in another embodiment. The method includes connecting multiple series of pipe panels lengthwise with respect to the pipes, each pipe panel comprising a first end and a second end, and connecting first manifolds to the first ends of the final pipe panels in each series. The method also includes connecting second manifolds to the second ends of the final pipe panels in each series; and connecting the first manifold of each series to the first manifold of another series. The method further includes connecting the second manifold of each series to the second manifold of another series.

In yet another embodiment, a solar water heater having a pipe panel comprising a plurality of pipes, a source of water to feed water to the pipe panel, and a reservoir of water to receive water heated by the pipe panel is provided. The plurality of pipes include an inner diameter between about 0.375 inches and about 0.625 inches. In still a further embodiment, the plurality of pipes include an inner diameter of about 0.622 inches. In yet a further embodiment, the plurality of pipes include an inner diameter of 0.622 inches.

BRIEF DESCRIPTION OF THE DRAWINGS

FIGS. 5A and 5B are back and front views of the panel of FIG. 2.

FIG. 5C is a cross-sectional view of the panel of FIG. 5B taken along line 5C-5C.

DETAILED DESCRIPTION

Any feature or combination of features described herein are included within the scope of the present invention provided that the features included in any such combination are not mutually inconsistent as will be apparent from the context, this description, and the knowledge of one skilled in the art. In addition, any feature or combination of features may be specifically excluded from any embodiment of the present invention. For purposes of summarizing the present invention, certain aspects, advantages, and novel features of the present invention are described herein. Of course, it is to be understood that not necessarily all such aspects, advantages, or features will be embodied in any particular embodiment of the present invention.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the invention in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the invention.

Modular Construction

Figure 1:
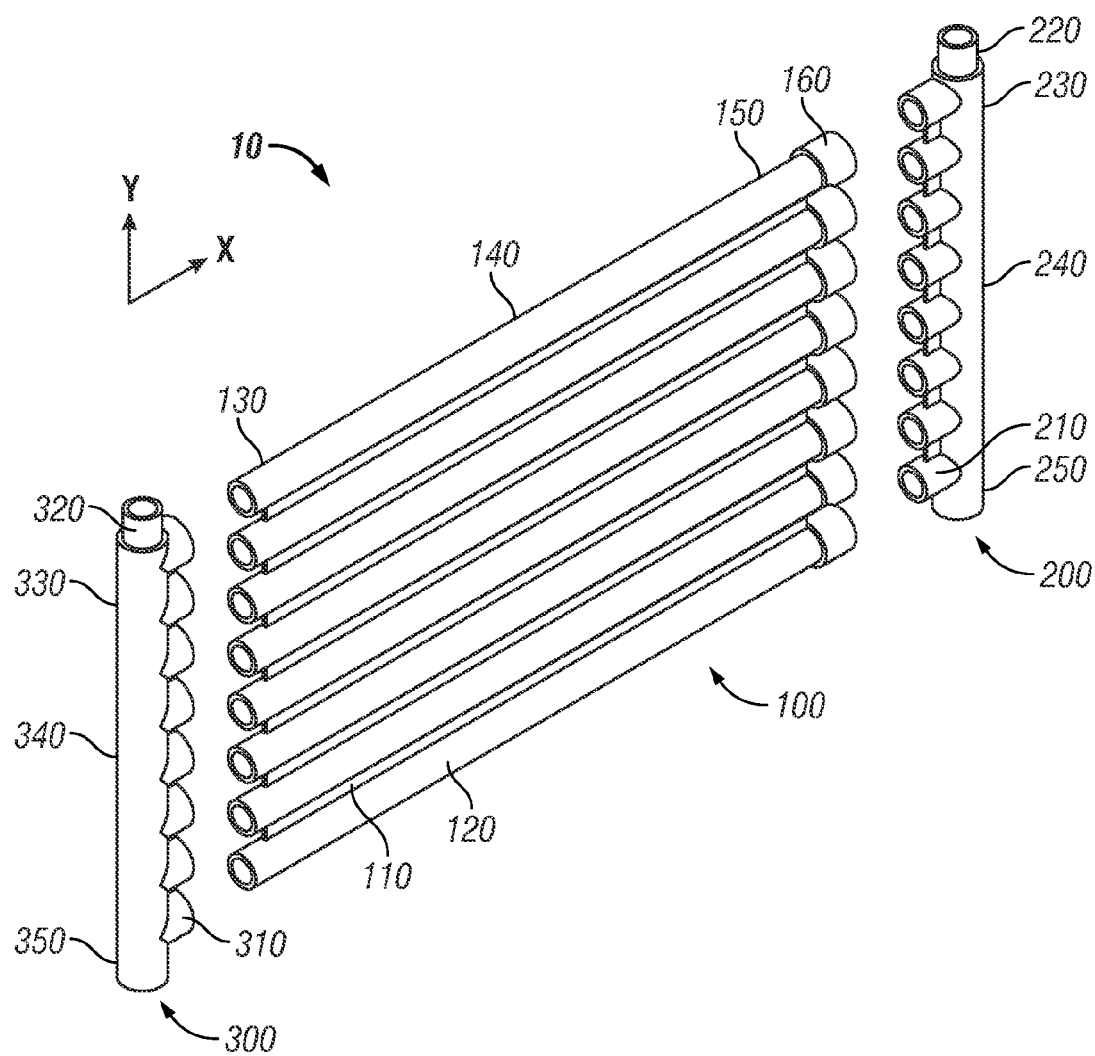
FIG. 1 is an exploded perspective view of an embodiment of a solar water heating device.

FIG. 1 is an exploded perspective view of an embodiment of a solar water heating device 10. The device includes a panel or pipe panel 100, a first manifold 200, and a second manifold 300. Each of the members 100, 200, and 300 are modular according to some aspects, such that the members are constructed with standardized dimensions and can be interchangeably connected to other members. As described above, the device 10 may serve as a thermal collector in a solar water heating system. The device 10 may be connected to a fluid system that moves a working fluid, such as water, from the device 10 to a location where the heated fluid is used. For example, cold water can be pumped to and/or circulated through the device 10 to be heated by the sun's radiation, then heated water can flow to a collection or reservoir tank for storage and subsequent use. The device 10 can be used in forced convection installations, whereby water is pumped through the device 10, and in natural convection installations, such as, for example, thermal siphon type systems.

Figure 2:
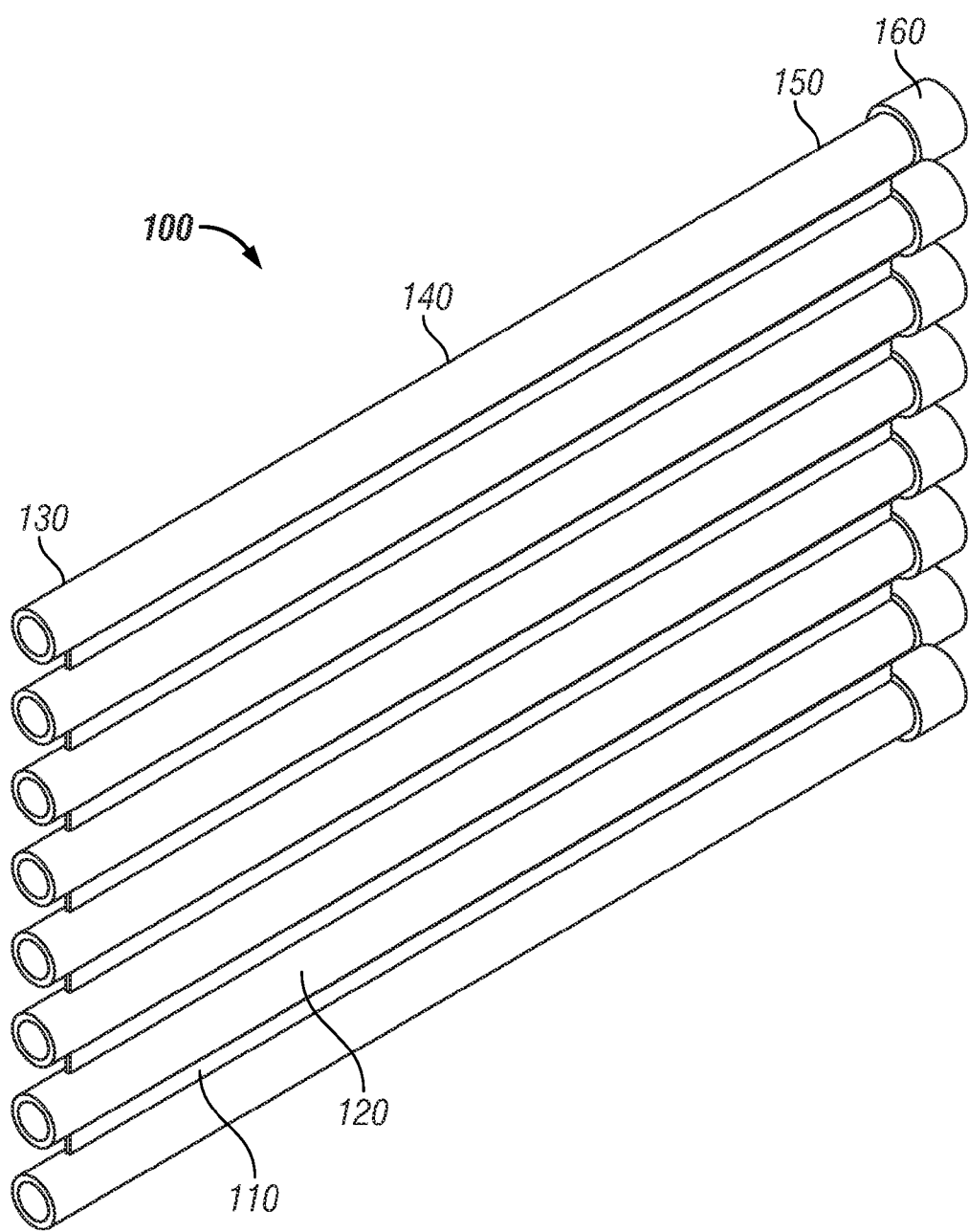
FIG. 2 is a perspective view of a panel of the device of FIG. 1.

FIG. 2 illustrates a close-up perspective view of the panel 100 of FIG. 1. FIGS. 5A and 5B are back and front views of the panel of FIG. 2. FIG. 5C is a cross-sectional view of the panel of FIG. 5B taken along line 5C-5C. The panel 100 can be a multi-pipe piece with fins 110 connecting one or more pipes 120. Persons of skill in the art will understand that while FIG. 1 illustrates 8 pipes 120, the panel 100 can include any suitable number of pipes. At one end 130 of the panel 100, the pipe 120 extends straight such that the outer and inner diameters of the pipe 120 at end 130 are the same as or substantially similar to the outer and inner diameters of the pipe 120 at a center section 140. At the other end 150 of the panel 100, the pipe 120 includes a fitting 160. In the embodiment illustrated in FIG. 2, the inner diameter of the fitting 160 is slightly greater than the outer diameter at the center section 140. In an alternate embodiment (not illustrated), the outer diameter of the fitting 160 is slightly less than the inner diameter at the center section 140.

The panel 100 is modular, such that multiple panels 100 are constructed with standardized dimensions and any one panel 100 can be interchangeably connected to any other panel 100, first manifold 200, or second manifold 300. To connect the panel 100 illustrated in FIG. 2 to another panel, the pipe ends 130 of one panel 100 are inserted into the fittings 160 at the end 150 of a second panel 100. In embodiments where the outer diameter of the fitting 160 is slightly less than the inner diameter at the center section 140, panels can be connected by inserting the fitting 160 of one panel into the end 130 of a second panel. Thus, extended lengths of panels along a first axis (referred to herein as the x-dimension or x-axis) of FIG. 1 can be created by connecting any number of panels end to end as described above.

The panel 100 can be constructed of any suitable dimension. In some aspects, the panel 100 is at least approximately one foot in length and at least approximately one foot in width.

Referring again to FIG. 1, the first manifold 200 includes first connectors 210. The first manifold 200 can also include fins 215 connecting one or more first connectors 210. The first connectors 210 can be configured to connect or join the first manifold 200 to fittings 160 of the panel 100. Thus, in one embodiment, the connectors 210 in the first manifold 200 correspond to the ends 130 of pipes in the panel 100. In the embodiment illustrated in FIG. 1, the outer diameter of the first connectors 210 is slightly less than the inner diameter of the fitting 160 of the panel 100, such that the first connector 210 can be inserted into the fitting 160 to join the first manifold 200 to the panel 100.

Figure 3:
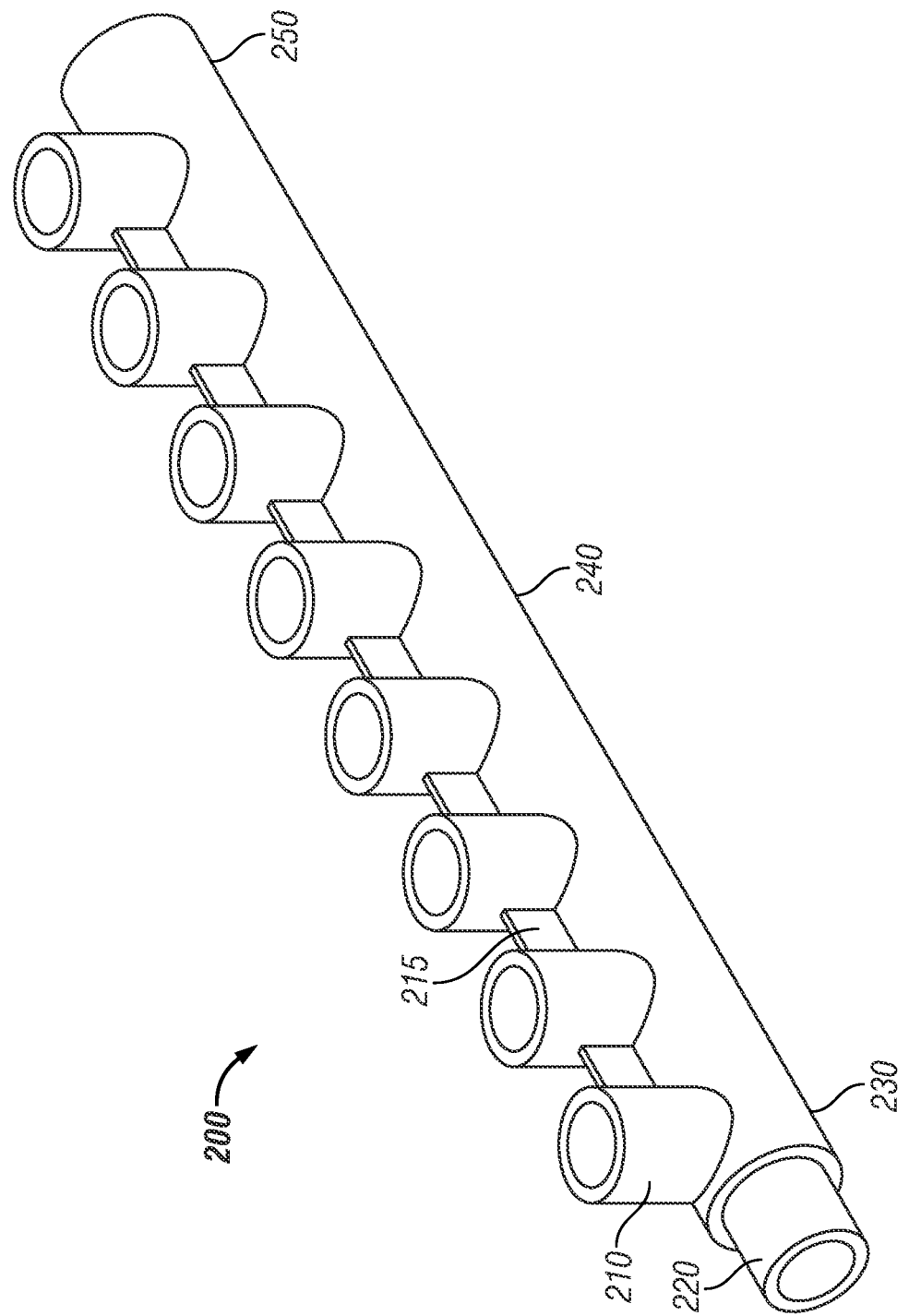
FIG. 3 is a perspective view of a first manifold of the device of FIG. 1.
Figure 6A:
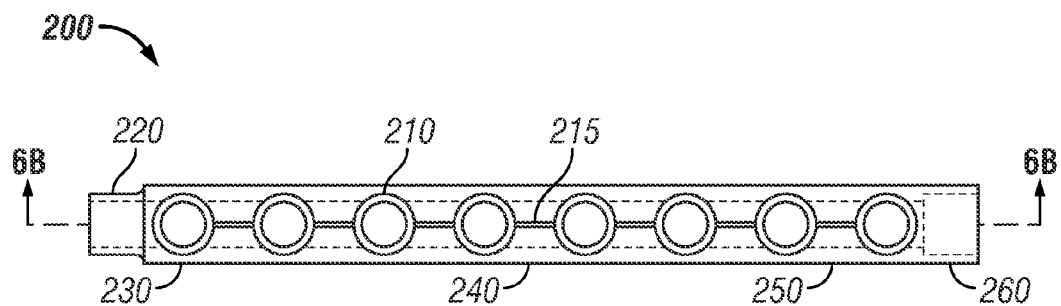
FIGS. 6A is a top view of the first manifold of FIG. 3, with interior features illustrated in dashed lines.
Figure 6B:
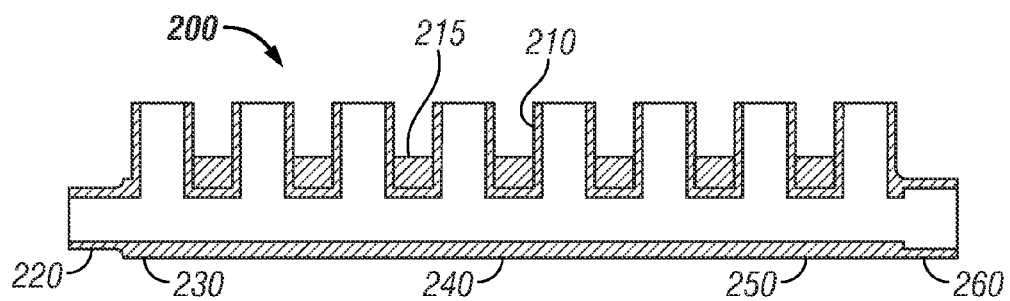
FIG. 6B is a cross-sectional view of the first manifold of FIG. 6A taken along line 6B-6B.

The first manifold 200 will now be described in greater detail with reference to FIGS. 3 and 6A-6B. FIG. 3 illustrates a close-up perspective view of the first manifold 200 of FIG. 1. FIG. 6A is a top view of the first manifold 200, and FIG. 6B is a cross-sectional view of the first manifold 200 of FIG. 6A taken along line 6B-6B. The first manifold 200 includes an end fitting 220 at one end 230 of the first manifold 200. At the other end 250, the first manifold 200 includes an end fitting 260 which is not illustrated in FIG. 3, but is illustrated in FIGS. 6A-6B. The outer diameter of the end fitting 220 is slightly less than the inner diameter of the other end fitting 260.

Thus, like the panel 100, the first manifold 200 is modular, such that multiple first manifolds 200 are constructed with standardized dimensions and any one manifold 200 can be interchangeably connected to another first manifold 200 in an end to end arrangement. To connect the manifold 200 illustrated in FIG. 3 to another manifold, the end fitting 220 of one manifold 200 is inserted into the end fitting 260 of another manifold 200. Persons of skill in the art will understand that other fitting configurations are possible, such that modular first manifold 200 can be interchangeably connected to one another at their respective ends 230, 250.

Referring again to FIG. 1, the second manifold 300 includes second connectors 310 which can be configured to connect or join the second manifold 300 to the panel 100 at end 130. Thus, the second connectors 310 in the second manifold 300 correspond to the fittings 160 in the panel 100. In the embodiment illustrated in FIG. 1, the inner diameter of the second connectors 310 is slightly greater than the outer diameter of the end 130 of the pipe, such that the end 130 can be inserted into the second connector 310 to join the second manifold 300 to the panel 100.

Figure 4:
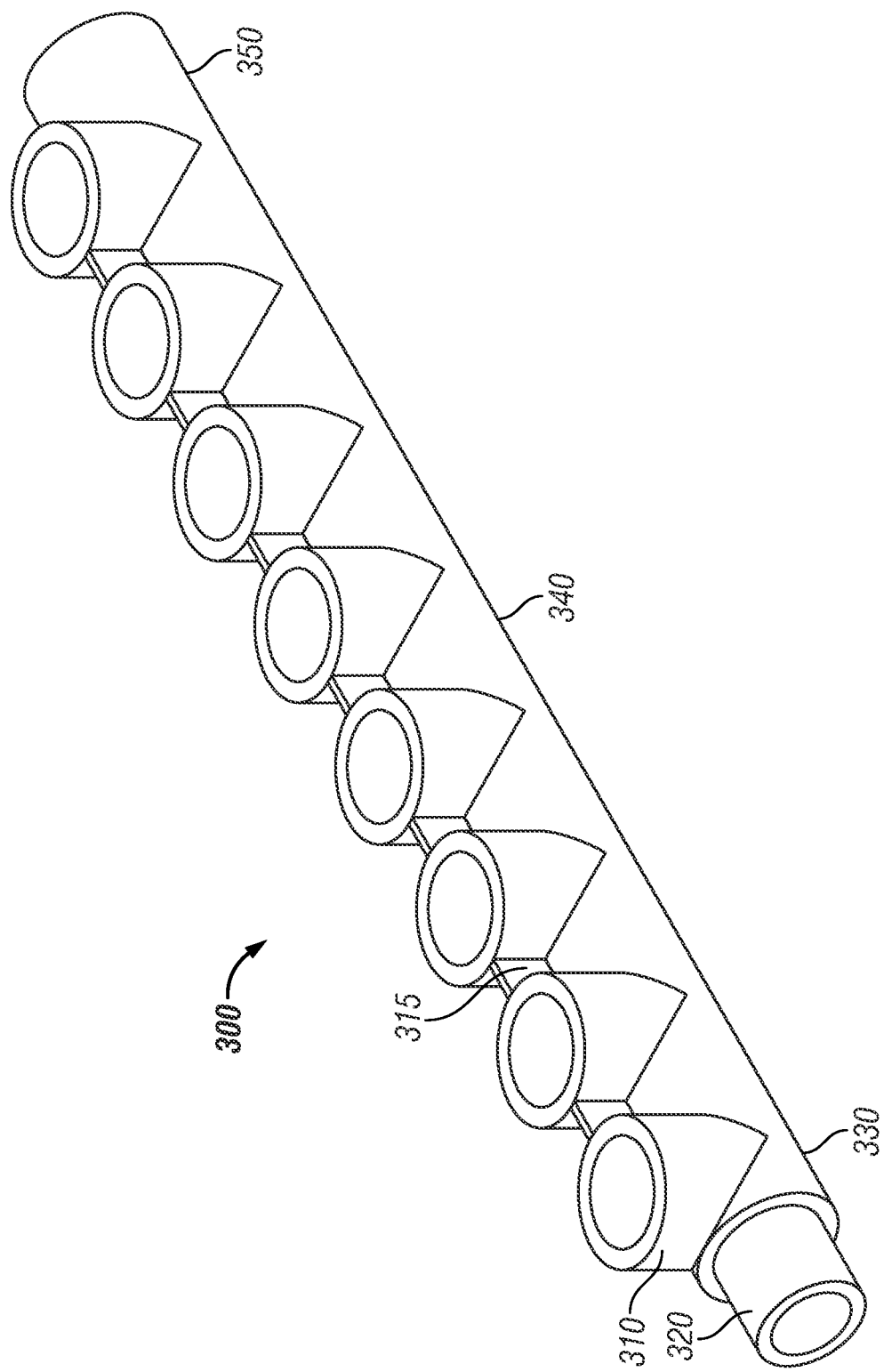
FIG. 4 is a perspective view of a second manifold of the device of FIG. 1.
Figure 7A:
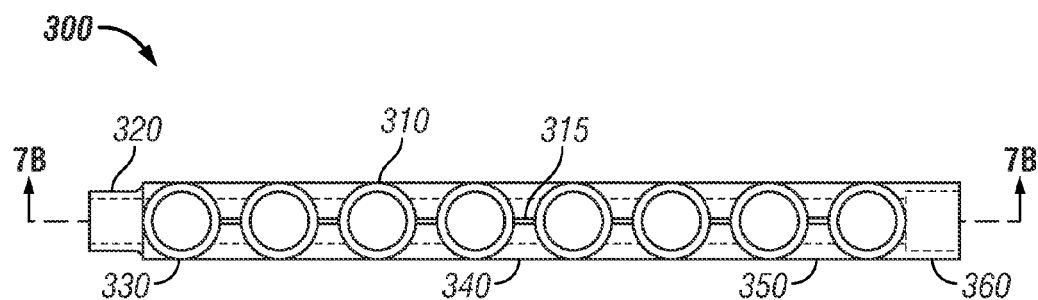
FIGS. 7A is a top view of the second manifold of FIG. 4, with interior features illustrated in dashed lines.
Figure 7B:
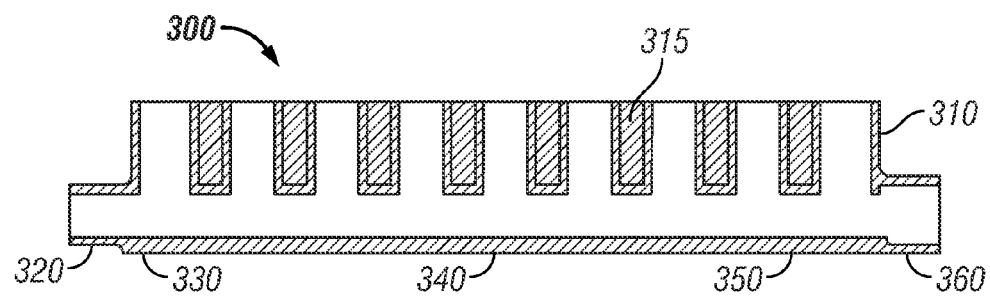
FIG. 7B is a cross-sectional view of the second manifold of FIG. 7A taken along line 7B-7B.

The second manifold 300 will now be described in greater detail with reference to FIGS. 4 and 7A-7B. FIG. 4 illustrates a close-up perspective view of the second manifold 300 of FIG. 1. FIGS. 7A is a top view of the second manifold 300, while FIG. 7B is a cross-sectional view of the second manifold 300 of FIG. 7A taken along line 7B-7B. The second manifold 300 includes an end fitting 320 at one end 330. At the other end 350, the second manifold 300 includes an end fitting 360 that is not illustrated in FIG. 4, but is illustrated in FIGS. 7A-7B. The outer diameter of the end fitting 320 is slightly less than the inner diameter of the other end fitting 360. The second manifold 300 can also include fins 315 connecting one or more second connectors 310.

Like the members 100, 200, the second manifold 300 is modular, such that multiple second manifolds 300 are constructed with standardized dimensions and any one manifold 300 can be interchangeably connected to another second manifold 300 in an end to end arrangement. To connect the manifold 300 illustrated in FIG. 4 to another manifold, the end fitting 320 of one manifold 300 is inserted into the end fitting 360 of another manifold 300. Persons of skill in the art will understand that other fitting configurations are possible, such that modular second manifolds 300 can be interchangeably connected to one another at their respective ends 330, 350.

A method of assembling the device 10 will now be described with reference to FIG. 1. To assemble the device 10, the first connectors 210 of the first manifold 200 are inserted into the fittings 160 of the panel 100 and the ends 130 of the panel 100 are inserted into the second connectors 310 of the second manifold 300. The pieces may be constructed, molded, or otherwise formed such that the panel 100, the first manifold 200, and the second manifold 300 engage with, for example, a water-tight slip fit.

FIG. 1 illustrates a device comprising one panel 100, one first manifold 200, and one second manifold 300. However, with multiple members 100, 200, 300 connected to each other in a repeating pattern, the modular design of embodiments of the panel 100, the first manifold 200, and the second manifold 300 allows the device to be expanded along both first and second axes (herein referred to as x- and y-dimensions or x- and y-axes). The axes may be perpendicular as illustrated.

To expand the device 10 in the y-direction, manifolds on each side are connected end to end to the desired y-dimension. Caps of suitable dimensions can cap off the open ends of the final first and second manifolds. To expand the device 10 in the x-direction, multiple panels are connected end to end until the desired x-direction dimension is attained. Manifolds 200, 300 are then connected to the unattached ends of the panels as described in greater detail above.

Optimized Pipe Diameter

Embodiments of the device 10 according to the present invention can also be used to optimize the performance and energy efficiency of solar water heaters in unexpected and surprising ways. Specifically, the inner diameter of the pipes 120 in the panels 100 may be optimized for good heating efficiency while maintaining a high level of water circulation through the device 10. Thus, in one embodiment, the device 10 includes panels 100 comprising pipes 120 whose diameter falls within a specific, optimized range of diameters. It is also advantageous when the inner diameters of the first and second manifolds 200, 300 are similarly optimized.

Advantages of an optimized diameter, or range of diameters, according to aspects of the present invention will now be described in detail. Operating efficiency of forced convection-type heaters improves when a moderate turbulence is created and the laminar central flow is minimized as water is pumped. In contrast, flow in a natural convection-type heater, which is laminar in nature, improves with smaller diameters that have less "cold core" because of temperature gradient and energy equalization. Extensive experiments have now shown that the range with good operating efficiency under both conditions is about 0.375 inches to about 0.625 inches. In one embodiment, a diameter of 0.622 inches (or alternatively about 0.622 inches) accommodates structural and tooling considerations, as well as a large volume of water through the device 10.

As used herein, the term "about" or "approximately" means a range of ±1% of a given value. In one embodiment, a diameter of about 0.622 inches means a diameter of 0.622 inches plus or minus 1%. A diameter of 0.622 inches means 0.622 inches within industry accepted manufacturing tolerances for the components being manufactured.

The fins 110 and the first and second manifolds 200, 300 can be dimensioned to accommodate the optimized pipe diameters described above. The dimensions of the manifolds 200, 300 can also be selected to reduce the possibility of air clogs which, in the case of natural convection, could interfere with optimal flow.

Embodiments of the present invention include various surfaces to increase energy absorption and efficient flow. In one embodiment, the outer surface of the panels 100 is not polished to increase the effective surface exposed to solar radiation. In another embodiment, the inner surface of the panel 100 is smooth to achieve laminarity in a natural convection-type system, with little or no effect in the turbulence desired in a forced convection-type system.

Specific, optimized pipe diameters according to the present invention will now be described with reference to FIGS. 5C, 6B, and 7B. The pipe 120 of the panel 100 includes an inner diameter of 0.622 inches and an outer diameter of 0.840 inches. The pipes 120 also include fittings 160 with an inner diameter of 0.848 inches.

Referring now to FIG. 6B, the first manifold 200 includes first connectors 210 with an inner diameter of 0.622 inches and an outer diameter of 0.840 inches. This outer diameter of 0.840 inches is less than the inner diameter, 0.848 inches, of the fitting 160 of the panel 100. In this embodiment, there is a 0.008 inch tolerance between the members when they are joined as described above. It will be understood, however, that any suitable tolerance that allows the first connectors 210 to be inserted into the fittings 160 can be used.

As illustrated in FIG. 7B, the second manifold 300 includes first connectors 310 with an inner diameter of 0.848 inches. This inner diameter of 0.848 inches is greater than the outer diameter, 0.840 inches, of the end 130 of the pipe 120. In this embodiment, there is a 0.008 inch tolerance between the two members when they are joined as described above, but it will be understood that any suitable tolerance that allows the ends 130 to be inserted into the second connectors 310 can be used. U.S. Provisional Patent Application Ser. No. 61/184,646 illustrates additional advantageous dimensions of certain specific embodiments; all of these dimensions are hereby incorporated by reference in their entirety.

The above-described embodiments have been provided by way of example, and the present invention is not limited to these examples. Multiple variations and modifications to the disclosed embodiments will occur, to the extent not mutually exclusive, to those skilled in the art upon consideration of the foregoing description. Additionally, other combinations, omissions, substitutions and modifications will be apparent to the skilled artisan in view of the disclosure herein. Accordingly, the present invention is not intended to be limited by the disclosed embodiments.

What is claimed is:

1. A modular pipe system for a solar water heater, comprising:
   a plurality of first manifolds, each first manifold having a first end fitting and a second end fitting, the first end fitting of any first manifold interchangeably connectable to the second end fitting of any other first manifold;
   a plurality of second manifolds, each second manifold having a first end fitting and a second end fitting, the first end fitting of any second manifold interchangeably connectable to the second end fitting of any other second manifold; and
   a plurality of panels, each panel comprising a plurality of pipes, each panel interchangeably connectable to any other panel, any of the plurality of first manifolds, and any of the plurality of second manifolds,
   wherein connecting the first end fitting of any first manifold to the second end fitting of any other first manifold and connecting the first end fitting of any second manifold to the second end fitting of any other second manifold expands the system along a first axis,
   wherein connecting a plurality of panels expands the system along a second axis perpendicular to the first axis, and
   wherein each of the plurality of first manifolds has a different panel connector configuration than each of the plurality of second manifolds.

2. The system of claim 1, wherein each of the plurality of pipes comprises a first end and a second end, and wherein the first end comprises a fitting and the second end does not comprise a fitting.

3. The system of claim 2, wherein an inner diameter of the fitting is slightly greater than an outer diameter of a center section of the pipe.

4. The system of claim 2, wherein an outer diameter of the fitting is slightly less than an inner diameter of a center section of the pipe.

5. The system of claim 2, wherein connecting the fittings of the pipes of any panel to the second ends of the pipes of any other panel expands the system along the second axis.

6. The system of claim 1, wherein an outer diameter of the first end fitting of each first manifold is slightly less than the inner diameter of the second end fitting of each first manifold.

7. The system of claim 1, wherein an outer diameter of the first end fitting of each second manifold is slightly less than the inner diameter of the second end fitting of each second manifold.

8. The system of claim 1, wherein each first manifold comprises a plurality of first connectors configured for connection to the fittings of the pipes of any of the plurality of panels.

9. The system of claim 1, wherein each second manifold comprises a plurality of second connectors configured for connection to the second ends of the pipes of any of the plurality of panels.

10. The system of claim 1, wherein each of the plurality of panels is at least approximately one foot in length and width.

11. The system of claim 1, wherein each panel comprises a single piece of molded material.

12. The system of claim 1, wherein each panel comprises a plurality of pipes integrated into a single piece panel.

13. The system of claim 12, wherein each single piece panel comprises fins integrally connecting the plurality of pipes.

* * * * *